United States Patent [19]

Cleary

[11] 4,049,635

[45] Sept. 20, 1977

[54] PRODUCTION OF TETRAMETHYLENE TEREPHTHALATE POLYMERS USING 225° TO 248° C. POLYCONDENSATION TEMPERATURE

[75] Inventor: James W. Cleary, Bartlesville, Okla.

[73] Assignee: Phillips Petroleum Company, Bartlesville, Okla.

[21] Appl. No.: 649,951

[22] Filed: Jan. 19, 1976

[51] Int. Cl.$^2$ ............................................. C08G 63/14
[52] U.S. Cl. ................................................ 260/75 R
[58] Field of Search ..................................... 260/75 R

[56] References Cited

U.S. PATENT DOCUMENTS

| | | | |
|---|---|---|---|
| 2,727,881 | 12/1955 | Caldwell et al. | 260/75 R |
| 3,817,935 | 6/1974 | Beer | 260/75 R |
| 3,907,754 | 9/1975 | Tershansy et al. | 260/75 R |
| 3,965,071 | 6/1976 | McClelland | 260/75 R |

FOREIGN PATENT DOCUMENTS

| | | | |
|---|---|---|---|
| 1,900,270 | 11/1969 | Germany | 260/75 R |
| 2,315,272 | 11/1973 | Germany | 260/75 R |
| 2,213,259 | 9/1973 | Germany | 260/75 R |
| 49-21497 | 2/1974 | Japan | 260/75 R |
| 75-38791 | 4/1975 | Japan | 260/74 R |

Primary Examiner—Lucille M. Phynes

[57] ABSTRACT

1,4-Butanediol and a dialkyl benzenedicarboxylate such as dimethyl terephthalate are subjected to transesterification conditions and thereafter to polycondensation in the presence of a tetraalkyl titanate catalyst at a temperature within the range of 225° to 248° C.

8 Claims, No Drawings

PRODUCTION OF TETRAMETHYLENE TEREPHTHALATE POLYMERS USING 225° TO 248° C. POLYCONDENSATION TEMPERATURE

BACKGROUND OF THE INVENTION

This invention relates to the preparation of tetramethylene terephthalate polymers.

It is known to carry out transesterification reactions utilizing titanium compounds as catalyst and thereafter to heat under reduced pressure to effect polycondensation.

Previously, it had been considered necessary to carry out at least a portion of the polycondensation at a temperature within the range of 250° to 300° C.

SUMMARY OF THE INVENTION

It is an object of this invention to provide an improved process for producing tetramethylene terephthalate polymers;

It is a further object of this invention to achieve high viscosity in tetramethylene terephthalate polymers.

In accordance with this invention it has been found that with the specific reactant 1,4-butanediol and at least one dialkyl benzenedicarboxylate using a tetraalkyl titanate catalyst, improved results are obtained by carrying out the polycondensation in the melt at a temperature within the range of 225° to 248° C., the temperature at no time during the polycondensation exceeding 248° C.

DESCRIPTION OF THE PREFERRED EMBODIMENTS

This invention relates to a process for the preparation of tetramethylene terephthalate polymers of high molecular weight.

In accordance with this invention, a tetramethylene terephthalate polymer is produced by the polymerization of 1,4-butanediol with at least one dialkyl benzenedicarboxylate consisting essentially of about 80 to 100 mole percent of at least one dialkyl terephthalate and 0 to about 20 mole percent of at least one ester selected from dialkyl phthalates and dialkyl isophthalates, in the presence of at least one tetraalkyl titanate as a catalyst. The resulting tetramethylene terephthalate polymer has a higher molecular weight, based on higher inherent viscosity, as a result of employing a maximum polycondensation temperature within the range of 225 C. to 248° C. instead of a temperature of 250° C. or higher. By use of a maximum temperature within the range of 225° C. to 248° C., the polycondensation takes place at a satisfactorily high rate, and degradation of the polymer is maintained at a sufficiently low rate, thereby making possible the production of a tetramethylene terephthalate polymer of high molecular weight. A high molecular weight is needed in order that the molded resin will exhibit its most desirable properties.

Tetramethylene terephthalate polymer as used herein is meant to include not only the homopolyester, poly(tetramethylene terephthalate), but also copolyesters in which at least 80 percent, by number, of the recurring units are tetramethylene terephthalate units and up to 20 percent, by number, of the recurring units are tetramethylene phthalate and/or tetramethylene isophthalate units.

Each alkyl group in the dialkyl terephthalates for use in the process of this invention should have 1 to 4 carbon atoms. Examples in some suitable dialkyl terephthalates which can be employed include dimethyl terephthalate, diethyl terephthalate, dipropyl terephthalate, diisopropyl terephthalate, propyl butyl terephthalate, dibutyl terephthalate, and the like, and mixtures thereof. Dimethyl terephthalate is preferred.

Each alkyl group in the dialkyl phthalates and in the dialkyl isophthalates which can be used in the process of this invention should have 1 to about 4 carbon atoms. Examples of some dialkyl phthalates and dialkyl isophthalates which can be employed include dimethyl phthalate, diethyl phthalate, ethyl propyl phthalate, dipropyl phthalate, diisopropyl phthalate, dibutyl phthalate, dimethyl isophthalate, diethyl isophthalate, dipropyl isophthalate, diisopropyl isophthalate, propyl isobutyl isophthalate, dibutyl isophthalate, and the like, and mixtures thereof.

The transesterification and polycondensation catalyst is a tetraalkyl titanate of the formula $Ti(OR)_4$ wherein each R is an alkyl group having 1 to about 6 carbon atoms. Examples of some tetraalkyl titanates which can be employed include tetramethyl titanate, dimethyl diethyl titanate, tetraethyl titanate, tetrapropyl titanate, tetraisopropyl titanate, isopropyl tributyl titanate, tetrabutyl titanate, tetraisobutyl titanate, tetrapentyl titanate, tetrahexyl titanate, and the like, and mixtures thereof.

Although the mole ratio of 1,4-butanediol to total dialkyl benzenedicarboxylate can vary over a wide range, generally it will be within the range of about 1.1:1 to about 5:1, preferably about 1.3:1 to about 3:1. The amount of tetraalkyl titanate can vary greatly, generally being within the range of about 0.05 to about 3, preferably about 0.2 to about 2, millimoles per mole of total dialkyl benzenedicarboxylate.

The process of this invention should be conducted in two stages sometimes referred to as the transesterification stage and the polycondensation stage.

In the transesterification stage the mixture of 1,4-butanediol, dialkyl benzenedicarboxylate, and tetraalkyl titanate is heated at temperatures within the range of about 130° C. to about 248° C., preferably about 140° C. to about 245° C., at substantially atmospheric pressure. After the alkanol by-product first begins to distill, it is preferable that the temperature be raised gradually, e.g., about 10° C. every 10 minutes (all within the range of 130° C. to 248° C.), until most of the alkanol by-product has distilled. The transesterification stage generally is readily conducted over a period within the range of about three-fourth hour to about 3 hours.

The subsequent polycondensation stage is conducted by maintaining the mixture from the transesterification stage at a temperature within the range of about 225° C. to 248° C., preferably about 230° C. to about 245° C. In the first part of this stage the pressure is reduced substantially, e.g., from about atmospheric to a level within the range of about 100 to about 400 mm Hg, thereby distilling nearly all of the excess 1,4-butanediol. This distillation can be conducted as rapidly as means for the removal of distillate will permit, usually requiring less than 1 hour. The pressure is then reduced to a level less than about 1.5 mm Hg, and the temperature is maintained as described above for the polycondensation stage until the inherent viscosity reaches approximately its maximum value, this usually being within the range of about 2 hours to about 8 hours. Preferably an inert gas such as nitrogen is bubbled through the melt to aid in the removal of volatile substances during this time that the pressure is maintained at about 1.5 mm Hg or less.

In the preparation of the tetramethylene terephthalate polymers by the process of this invention conventional additives such as pigments, antistatic agents, dyes, glass fibers, stabilizers, and flame-proofing agents can be added before, during, or after the transesterification or polycondensation stages.

Although the tetramethylene terephthalate polymers are useful in applications such as films and fibers, they are particularly valuable as molding resins.

EXAMPLES

In a series of runs conducted at various temperatures and catalyst levels, poly(tetramethylene terephthalate) was prepared in a two-liter, stainless steel, stirred autoclave designed for polycondensation reactions. The reactants and catalyst were weighed into the reactor, and the top was bolted on. In each run 388 g (2.00 moles) of dimethyl terephthalate and 450 g (5.00 moles) of 1,4-butanediol were employed as reactants, and various amounts of tetraisopropyl titanate were employed as catalyst. An anchor-type stirrer with high blades to wipe polymer off the reactor walls was used at 10 rpm. For the transesterification reaction at atmospheric pressure, the reactor was equipped with a 0.50 inch O.D. stainless steel tube which rose 15 inches vertically and 12 inches horizontally in two bends and thence 18 inches downward to a graduated cylinder as a receiver. This air-cooled tube allowed the 1,4-butanediol to reflux and return to the reactor any solids which had sublimed and also allowed substances such as methanol and water to pass overhead to the receiver. A 1000-watt band heater was placed around the head of the reactor to keep the head and upper walls hot enough to prevent sublimate and oligomers from freezing on these surfaces, so such substances dripped back into the melt. The temperature of the reactor was increased at the rate of approximately 10° C. every 10 minutes from the time of the first drops of distillate (reactor temperature within the range of about 145° C. to about 175° C.) to about 220° C. After a period of about 10 minutes to about 1 hour, at which time the distillation of methanol was substantially complete, the vertical tube was replaced with a horizontal tube about 4 inches from the reactor, which then sloped slightly downward 15 inches to a large-bore valve, thence 18 inches downward with a straight tube. A 500-ml suction flask was used as a receiver and was attached to the tube with a one-hole rubber stopper. The flask was immersed in an ice bath, and house vacuum (about 200 to about 380 mm Hg pressure) was slowly applied. The use of a water jacketed condenser was discontinued as any sublimate or polymer mechanically carried over would freeze and block the tube. The temperature of the system was increased to that desired for the polycondensation, i.e., a temperature within the range of 230° C. to 255° C. After about 10 minutes at this temperature, distillation usually had stopped, and open pump vacuum was slowly applied, reaching about 1 mm Hg or less. After about 30 minutes at this pressure a stream of nitrogen was slowly bubbled through the melt to help sweep volatile substances, mostly 1,4-butanediol, from the reactor, while discontinuing the application of vacuum. The system was brought to atmospheric pressure, the take-off tube was removed, and a sample of the polymer melt was obtained by inserting a 0.25 inch O.D. stainless steel tube flattened at one end. Sufficient polyester froze on the tube for the determination of inherent viscosity. This initial sample is called the zero hour sample. The system was again placed under vacuum, using a pressure of about 1 mm Hg or less, with the nitrogen stream bubbling through the melt at about 0.6 liter per hour as the polycondensation proceeded. Additional samples of polymer for inherent viscosity determination were obtained at intervals to follow the progress of polycondensation. After the polycondensation had been conducted for the desired period of time, the poly(tetramethylene terephthalate) was removed from the autoclave, and its inherent viscosity was determined. The results are summarized in the following table.

TABLE

| Run | TPT[a] | Temp., ° C. | Inherent Viscosity[b] after Hours of Bubbling Nitrogen through Melt under Vacuum | | | | | | |
|---|---|---|---|---|---|---|---|---|---|
| | | | 0 | 1.5 | 2.5 | 3.0 | 3.5 | 4.0 | 4.5 |
| 1 | 1.77 | 255 | 0.22 | 0.58 | 0.95 | — | 1.01 | — | 0.92 |
| 2 | 1.77 | 250 | 0.25 | 0.69 | 1.10 | — | 1.08 | — | 0.95 |
| 3[c] | 1.71 | 245 | 0.23 | 0.36 | 0.62 | — | 0.95 | — | 1.01 |
| 4 | 0.87 | 255 | 0.26 | 0.68 | 1.07 | — | 0.96 | — | 0.81 |
| 5 | 0.88 | 250 | 0.22 | 0.54 | 1.01 | — | 1.09 | — | 1.00 |
| 6 | 0.89 | 245 | 0.23 | 0.57 | 1.00 | — | 1.26 | — | 1.18 |
| 7[d] | 0.90 | 245 | 0.25 | 0.64 | 1.03 | 1.09 | 1.14 | 1.12 | — |
| 8 | 0.89 | 245 | 0.29 | 0.84 | 1.16 | 1.17 | 1.14 | 1.11 | — |
| 9 | 0.89 | 245 | 0.24 | 0.48 | 0.93 | 1.09 | 1.13 | — | — |
| 10 | 0.90 | 245 | 0.20 | 0.56 | 0.99 | 1.13 | 1.23 | — | — |
| 11 | 0.89 | 240 | 0.21 | 0.66 | 1.12 | 1.22 | 1.24 | 1.16 | — |
| 12[e] | 0.89 | 235 | 0.17 | 0.46 | 0.67 | 0.68 | 0.80 | 0.91 | 1.03 |
| 13 | 0.88 | 230 | 0.19 | 0.44 | 0.63 | 0.82 | 0.93 | 1.13 | 1.18 |
| 14 | 0.65 | 245 | 0.23 | 0.62 | 0.96 | 1.14 | 1.21 | — | — |
| 15 | 0.45 | 245 | 0.23 | 0.63 | 0.95 | 1.08 | 1.16 | — | — |
| 16 | 0.26 | 245 | 0.23 | 0.47 | 0.64 | 0.76 | 0.86 | 0.93 | — |

[a]Tetraisopropyl titanate, millimoles per mole dimethyl terephthalate.
[b]Determined at 30° C. in a mixture of 3 parts by weight phenol and 2 parts by weight 1,1,2,2-tetrachloroethane at a polymer concentration of 0.5 g/100 ml solution. Where value is not given, inherent viscosity was not determined or reaction had been terminated.
[c]Pressure in system was 3.5–3.8 mm Hg during part of polycondensation.
[d]Pressure in system was 2.0–3.0 mm Hg during part of polycondensation.
[e]Tube almost completely plugged during polycondensation, resulting in a pressure which was not always as low as desired.

The improvement is inherent viscosity resulting from the use of polycondensation temperatures of 230° C. to 245° C., instead of 250° C. or 255° C., is demonstrated in Runs 4 through 13 of the above table. In each of these ten runs 0.87 to 0.90 millimole of tetraisopropyl titanate per mole of dimethyl terephthalate was employed. Runs 4 and 5 were control runs conducted at 255° C. and 250° C., respectively, whereas Runs 6, 8 through 11, and 13 were runs conducted at 245° C. to 230° C. by the process of this invention, the runs conducted at 245° C. being practically duplicates. In Runs 4 and 5 the maximum values determined for inherent viscosity were 1.07 and 1.09, respectively, and the inherent viscosity subsequently decreased as the reaction was permitted to continue. In Runs 6, 8 through 11, and 13 the maximum values determined for inherent viscosity ranged from 1.13 to 1.26, in some instances higher values would have been expected had the reaction been permitted to continue. In Run 7 the pressure was greater than desired during a portion of the polycondensation, as noted in the table. Although the maximum inherent viscosity observed in Run 12 was only 1.03, the inherent viscosity appeared to be still rising upon termination of the reaction and without doubt would have been considerably greater than 1.09 had there not been encountered the plugging difficulty which resulted in a pressure that was not always as low as desired.

Although the maximum inherent viscosity observed in Run 3 was only 1.01, compared with maximum inherent viscosity values of 1.01 and 1.10 in Runs 1 and 2, respectively, outside the scope of this invention, these three runs are not actually all comparable in view of the undesirably high pressure during a portion of the polycondensation in Run 3. The inherent viscosity of the polymer in Run 3 appeared to be still rising when the reaction was terminated.

Runs 14, 15, and 16 are additional runs conducted within the scope of this invention, using lower catalyst concentrations. In each instance the inherent viscosity of the polymer apparently was still rising when the reaction was terminated.

Evaluation of compression molded samples of the final polymer from Run 6 showed the polymer to have properties which would make it useful as a molding resin.

While this invention has been described in detail for the purpose of illustration it is not to be construed as limited thereby but is intended to cover all changes and modifications within the spirit and scope thereof.

I claim:

1. A process for preparing a polyester comprising; transesterifying 1,4-butanediol and at least one dialkyl benzenedicarboxylate consisting of 80 to 100 mole percent of at least one dialkyl terephthalate and 0–20 mole percent of at least one ester selected from dialkyl phthalates and dialkyl isophthalates, each of said alkyls of said dialkyl benzenedicarboxylate being selected from alkyl groups having 1 to 4 carbon atoms, by contacting said 1,4-butanediol and said at least one dialkyl benzenedicarboxylate with a transesterification and polycondensation catalyst consisting essentially of a tetraalkyl titanate of the formula $Ti(OR)_4$ wherein R is an alkyl group having 1 to 6 carbon atoms, said contacting being carried out at a temperature within a range of 130° C. to 248° C. at substantially atmospheric pressure; and thereafter subjecting the resulting mixture in a melt state to a temperature within the range of 225° to 248° C. and reduced pressure for a time within the range of 2 to 8 hours to effect polycondensation, said temperature during said polycondensation at no time exceeding 248° C.

2. The method according to claim 1 wherein said alkyl groups of said dialkyl benzenedicarboxylate are methyl groups.

3. The method according to claim 1 wherein said at least one dialkyl benzenedicarboxylate consists essentially of dimethyl terephthalate.

4. The method according to claim 1 wherein the mole ratio of said 1,4-butanediol to said dialkyl benzenedicarboxylate is within the range of 1.3:1 to 3:1.

5. The method according to claim 1 wherein said tetraalkyl titanate is tetraisopropyl titanate.

6. The method according to claim 1 wherein said catalyst is present in an amount within the range of 0.2 to 2 millimoles per mole of total dialkyl benzenedicarboxylate.

7. The method according to claim 1 wherein the temperature is raised during said transesterification, said transesterification taking place over a time period within the range of ¾ to 3 hours.

8. The method according to claim 7 wherein said at least one dialkyl benzenedicarboxylate consists essentially of dimethyl terephthalate, the mole ratio of said 1,4-butanediol to said dimethyl terephthalate is within the range of 1.3:1 to 3:1, said catalyst is tetraisopropyl titanate, and said catalyst is present in an amount within the range of 0.2 to 2 millimoles per mole of said dimethyl terephthalate.

* * * * *